United States Patent
Nguyen

(10) Patent No.: US 9,663,705 B2
(45) Date of Patent: May 30, 2017

(54) METHOD FOR RESOLVING EMULSIONS IN ENHANCED OIL RECOVERY OPERATIONS

(71) Applicant: Nalco Company, Naperville, IL (US)

(72) Inventor: Duy T. Nguyen, Sugar Land, TX (US)

(73) Assignee: Nalco Company, Naperville, IL (US)

(*) Notice: Subject to any disclaimer, the term of this patent is extended or adjusted under 35 U.S.C. 154(b) by 0 days.

(21) Appl. No.: 14/721,805

(22) Filed: May 26, 2015

(65) Prior Publication Data

US 2015/0252248 A1 Sep. 10, 2015

Related U.S. Application Data

(63) Continuation of application No. 12/822,815, filed on Jun. 24, 2010, now abandoned.

(51) Int. Cl.
*C10G 33/04* (2006.01)
*C09K 8/588* (2006.01)
*B01D 17/04* (2006.01)

(52) U.S. Cl.
CPC ............ *C09K 8/588* (2013.01); *B01D 17/047* (2013.01); *C10G 33/04* (2013.01)

(58) Field of Classification Search
CPC ................................ C10G 33/04; C09K 8/588
See application file for complete search history.

(56) References Cited

U.S. PATENT DOCUMENTS

| | | | |
|---|---|---|---|
| 3,320,317 A | 5/1967 | Rogers et al. | |
| 3,591,520 A * | 7/1971 | McDonald | B01D 17/047 516/142 |
| 3,929,632 A | 12/1975 | Buriks et al. | |
| 4,018,278 A | 4/1977 | Shupe | |
| 4,293,428 A | 10/1981 | Gale et al. | |
| 4,331,554 A | 5/1982 | Quinlan | |
| 4,374,734 A | 2/1983 | Newcombe | |
| 4,382,852 A | 5/1983 | McCoy et al. | |
| 4,384,950 A | 5/1983 | McCoy | |
| 4,444,654 A | 4/1984 | Cargle et al. | |
| 4,487,262 A * | 12/1984 | Venkatesan | C09K 8/592 166/271 |
| 4,559,148 A | 12/1985 | Ashrawi et al. | |
| 5,097,904 A | 3/1992 | Himes | |
| 2006/0062753 A1 | 3/2006 | Naraghi et al. | |

FOREIGN PATENT DOCUMENTS

| | | |
|---|---|---|
| EP | 0 308 138 A1 | 3/1989 |
| EP | 0 404 370 A2 | 12/1990 |

OTHER PUBLICATIONS

Ruiquan, Z., et al., "Characterization and Demulsification of Produced Liquid From Weak Base ASP Flooding," Colloids and Surfaces, 2006, pp. 164-171, vol. 290.

* cited by examiner

*Primary Examiner* — Randy Boyer
(74) *Attorney, Agent, or Firm* — Senniger Powers LLP

(57) ABSTRACT

Disclosed and claimed is a method of demulsifying an emulsion comprising water and oil. The method comprises adding an effective amount of a composition comprising at least one substantially fully quaternized ammonium adduct of polyephalohydrin that has a molecular weight from about 500 Da to about 2,500 Da.

20 Claims, No Drawings

METHOD FOR RESOLVING EMULSIONS IN ENHANCED OIL RECOVERY OPERATIONS

CROSS-REFERENCE TO RELATED APPLICATION

This application is a continuation of U.S. patent application Ser. No. 12/822,815, filed Jun. 24, 2010, the entire content of which is incorporated herein by reference.

FIELD OF THE INVENTION

This invention relates generally to the field of enhanced oil production and recovery. More specifically, the invention relates to the field of recovery of crude oil from produced emulsions of surfactant-polymer enhanced oil recovery floods. The invention has particular relevance to the use of quaternary ammonium salt adducts of polyepihalohydrin polymers to resolve such emulsions.

BACKGROUND OF THE INVENTION

The production of crude oil from reservoirs typically results in significant quantities of non-produced crude oil remaining in the reservoir. After primary oil recovery has been performed, secondary recovery (typically involving water injection), is commonly used to produce trapped oil. Frequently, much oil remains in the reservoir and tertiary recovery operations have been developed to produce the remaining oil. Most tertiary recovery methods for recovering such remaining crude oil include surfactant-polymer enhanced oil recovery floods, such as injecting a combination of surfactants and polymers in brine solutions into the reservoir. Other methods for enhanced oil recovery may include gas injection, chemical injection, ultrasonic stimulation, microbial injection, and thermal recovery. If the oil recovered using enhanced oil recovery floods cannot be efficiently treated (e.g., the emulsion broken into dry oil and clean water), then most if not all oil producers will be reluctant to conduct chemical floods in favor of other less aggressive and lower recovery processes.

Results of such conventional methods include a produced emulsion that typically contains crude oil, water, surfactant, and polymer. Drawbacks include difficulties in separating the emulsion into clean water and dry oil for efficient recovery of the crude oil and proper disposal of the water in an environmentally safe manner. Heat has been used to aid in resolving such emulsions but is not economical due to the large amounts of water involved. Solvent extraction is disclosed in U.S. Pat. No. 4,559,148, "Method of Extracting and Reutilizing Surfactants from Emulsions," but is also not practical due to the large capital investment and flammable solvent handling issues.

Consequently, there is a need for improved methods of resolving crude oil and water emulsions. Additional needs include improved methods for demulsifying the produced emulsion to produce a clean separation of the crude oil and water.

BRIEF SUMMARY OF THE INVENTION

Accordingly, the present invention provides a method for resolving emulsions produced through an enhanced oil recovery process. In an aspect, the method includes adding a composition comprising at least one quaternary ammonium adduct of polyepihalohydrin.

In an aspect, this invention meets the previously unmet need of efficiently demulsifying an emulsion comprising water and oil. The emulsions applicable in the method of the invention are preferably derived from an enhanced oil recovery process, though the method has equal applicability to any emulsions encountered in the art.

It is an advantage of the invention to provide a novel method of resolving an emulsion comprising oil and water.

It is another advantage of the invention to provide a novel method of efficiently resolving an emulsion comprising oil and water that was derived from an enhanced oil recovery process.

It is yet another advantage of the invention to provide a novel method of resolving an emulsion resulting from a chemical enhanced oil recovery flood comprising oil and water to produce dry oil and clean water.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims

DETAILED DESCRIPTION OF THE INVENTION

This invention comprises a method of treating an emulsion comprising oil and water derived from an oil recovery process. A preferred area of the method of the invention are emulsions derived from enhanced oil recovery processes where oil remaining in a reservoir after conventional recovery methods have been exhausted is produced through, for example, a polymer-surfactant flood. It should, however, be appreciated that the method of the invention has equal application to emulsions derived from any conventional or enhanced oil recovery operation. The objective of the present invention is to provide a method of resolving emulsions resulting in dry oil and clean water.

The emulsion produced from an enhanced oil recovery process is typically stabilized with surfactants and polymers. The method of the invention is applicable to any enhanced or tertiary oil recovery process. Exemplary methods of producing oil through such enhanced oil recovery processes are disclosed in U.S. Pat. No. 4,293,428, "Propoxylated Ethoxylated Surfactants and Method of Recovering Oil Therewith" and U.S. Pat. No. 4,018,278, "Surfactant Oil Recovery Process Usable in High Temperature Formations." U.S. Pat. No. 3,591,520 discloses the process of breaking an oil-in-water emulsion with a blend of high molecular weight quaternary adducts of polyepihalohydrin (MW>3000) and 10% zinc chloride at a ratio of at least 2.5 to 1 of metal salt to adduct. U.S. Pat. No. 3,320,317 discloses the use of partial quaternary ammonium adducts of epichlorohydrin having molecular weight from about 600 to about 100,000 as flocculating agents for improving the sedimentation of sewage solids.

In the method of the invention, emulsions are treated by a composition comprising low molecular weight (weight average molecular weight from about 500 Da to about 2,500 Da) substantially fully quaternized adducts of tertiary amines and polyepihalohydrin (>99% quaternized) to demulsify emulsions produced, for example, by surfactant-polymer enhanced oil recovery floods and recover dry oil and clean water. In a preferred embodiment, zinc chloride is substantially absent from the composition. The composition is more preferably free of zinc chloride. In sour systems, zinc chloride reacts with hydrogen sulfide presence in the crude oil to form zinc sulfide which can cause stable emulsion (i.e., rag layer between oil and water interface) and foul the separation vessels. High molecular weight quaternary ammonium adducts of epihalohydrin and partial quaternary ammonium adducts of epihalohydrin (particularly epichlorohydrin) were found to be less effective (see examples below) in the tested emulsions caused by chemical enhanced oil recovery floods. In such embodiments, the produced emulsions typically contain at least water, crude oil, surfactants, and polymers. Addition of the composition to the produced emulsion separates the oil and water phases. In some embodiments, the separation is a clean separation of oil and water. A clean separation generally refers to dry oil with less than about 1% total sediment and water, a good interface with sharp separation between oil and water, and clean water with less than about 300 parts per million (ppm) residual oil. The composition is added to the emulsion by any suitable method. (See e.g., Z. Ruiquan et al., "*Characterization and demulsification of produced liquid from weak base ASP flooding,*" Colloids and Surfaces, Vol. 290, pgs 164-171, (2006); U.S. Pat. Nos. 4,374,734 and 4,444,654).

In an embodiment, the composition of the invention includes water soluble quaternary adducts of polyepihalohydrin having molecular weights of from about 500 to 2,500 which have the general formula:

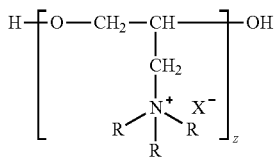

In the general formula, each R independently represents methyl or ethyl and z ranges from about 4 to about 22. X is a halide selected from fluoride, chloride, bromide, iodide, astatide, and any combination thereof. In a preferred embodiment, X is chloride and z is from 4 to 7. More preferably z is 6. In a further preferred embodiment, X is chloride, z is 6, and at least one R is methyl. More preferably, each R is methyl.

These materials may be prepared by any suitable method. Generally, the materials are prepared by reacting a polyepihalohydrin with trimethylamine or triethylamine at a molar ratio of 1:1.1 at temperatures from about 100° C. to 150° C., preferably at a temperature of about 100° C. If the quaternizing amine is volatile such as trimethylamine, the reaction is typically carried out in a closed vessel under the pressure such as an autoclave. The molecular weight of the polyepihalohydrin can be controlled by the epihalohydrin to water ratio in the presence of boron trifluoride as a catalyst. A preferred catalyst for preparation of the polyepihalohydrins of the invention is boron trifluoride, rather than the more common organoaluminum catalyst (See e.g., U.S. Pat. No. 3,591,520). The main advantage of using the boron trifluoride catalyst is that a smaller amount of catalyst is used.

The disclosed polyepihalohydrin composition may have any desirable amount of active material. In an embodiment, the composition has from about 30 wt % to about 90 wt % active material. Alternatively, the composition has from about 30 wt % to about 60 wt % or from about 40 wt % to about 70 wt %, and further alternatively the composition has from about 50 wt % to about 90 wt % active material. The composition is added to the emulsion in any suitable amount.

Embodiments further include a composition having the disclosed polyepihalohydrin and a solvent. The solvent may be any solvent suitable, for example, for dissolving or suspending the quaternary ammonium adducts of polyepihalohydrin. In embodiments, the solvent is water, alcohol, an organic solvent, or any combination thereof. The alcohol may include any alcohol suitable as a solvent and for use with oil recovery operations. Without limitation, examples of suitable alcohols include glycol, isopropyl alcohol, methanol, butanol, or any combination thereof. According to an embodiment, the organic solvent includes aromatic compounds, either alone or in any combination with the foregoing. In an embodiment, the aromatic compounds have a molecular weight from about 70 to about 400, alternatively from about 100 to about 200. Without limitation, examples of suitable aromatic compounds include toluene, xylene, naphthalene, ethylbenzene, trimethylbenzene, and heavy aromatic naphtha (HAN), other suitable aromatic compounds, and any combination of the foregoing. It is to be understood that the amount of quaternary ammonium adducts of polyepihalohydrin in the composition in relation to the solvent may vary in some embodiments depending upon factors such as temperature, time, and type of surfactant. For instance, without limitation, a higher ratio of a quaternary ammonium adduct of polyepihalohydrin to solvent may be used if a faster reaction time is desired.

The composition may also be added to the emulsion in any suitable amount. In an embodiment, the composition is added in an amount from about 50 ppm to about 20,000 ppm, based on actives and total emulsion volume. In alternative embodiments, from about 100 ppm to about 10,000 ppm of the surfactant, further alternatively from about 200 ppm to about 10,000 ppm surfactant, and further alternatively from about 200 ppm to about 500 ppm surfactant is added to the emulsion, based on actives and total emulsion volume.

In embodiments, the disclosed polyepihalohydrin composition is used in conjunction with other surfactants or additives. These other surfactants or additives may be added as part of the same composition or as a separate composition and may be added simultaneously or sequentially. For example, the composition may be added to the produced emulsion with one or more additional components selected from a cationic surfactant, a nonionic surfactant, an amphoteric surfactant, or any combination thereof.

Without limitation, the cationic surfactants include alkyl ammonium halide surfactants. Representative, cationic surfactants include any combination or at least one of an alkyl trimethyl ammonium halide, an alkyl dimethyl benzyl ammonium halide, and one or more imidazolinium halides. Molecular weights of such quaternary surfactants are in the range of about 200 to about 700, alternatively from about 250 to about 500. The alkyl trimethyl ammonium halide has an average alkyl chain length of $C_6$ to $C_{16}$, alternatively $C_6$ to $C_{10}$, and alternatively $C_{12}$ to $C_{18}$, and further alternative of $C_g$.

Without limitation, examples of suitable polymeric nonionic surfactants include polysorbates, fatty alcohols such as cetyl alcohol and oleyl alcohol, copolymers of polyethylene oxide, copolymers of polypropylene oxide, alkyl polyglucosides such as decyl maltoside, alkylphenol polyethylene oxide, alkyl polyethylene oxide, and ethoxylated propoxylated alkyl phenol-formaldehyde resin chemistry. The polymeric nonionic surfactant is typically dissolved or suspended in a solvent. Any solvent suitable for dissolving or suspending a polymeric nonionic surfactant may be used. Without limitation, examples of suitable solvents include water, ether, alcohol, toluene, xylene, heavy aromatic naphtha (HAN), other suitable organic solvents, or any combination thereof. The alcohol may include any alcohol suitable for use with oil recovery and for dissolving the polymeric nonionic surfactant. In an embodiment, the polymeric nonionic surfactant is dissolved or suspended in a solvent.

Without limitation, amphoteric surfactants useful in the composition of the invention include betaines, alkylamionpropionic acids, N-acyl glycinates, or any combination thereof. Any suitable betaine for use as a surfactant in the produced emulsion may be used. Without limitation, examples of suitable betaines include capryl/capramidopropyl betaine, cocobetaine, cocamidopropylbetaine, octyl betaine, caprylamidopropyl betaine, or any combination thereof. The N-acyl glycinate is preferably tallow dihydroxyethyl glycinate.

In an embodiment, the composition and the one or more additional components are added to the produced emulsion in a weight ratio of composition to polymeric nonionic surfactant from about 9:1, alternatively from about 1:1. In embodiments, the composition and, for example, polymeric nonionic surfactant are added about simultaneously (either as separate formulations or as part of the same formulation) or sequentially to the produced emulsion. Without being limited by theory, simultaneous addition to the produced emulsion of the composition and a polymeric nonionic surfactant generally provide improved quality of separated oil and aqueous phases. For instance, the simultaneous addition to the produced emulsion of the disclosed composition and water with a polymeric nonionic surfactant dissolved in an organic solvent improved the quality of the separated oil and aqueous phases.

The foregoing may be better understood by reference to the following examples, which are intended for illustrative purposes and are not intended to limit the scope of the invention.

Example 1

9 grams of water (0.50 mole) was added to a 500 ml 3-neck reactor flask, and then sparged with nitrogen for 15 minutes. 2 ml of boron trifluoride was slowly added and the mixture was heated to 60° C. When the temperature was reached 60° C., the heater was removed and 231.3 g of epichlorohydrin (2.5 mole) was slowly added with stirring. This reaction was exothemic and the temperature was kept between 90 and 100° C. with the use of an ice bath. After complete addition of epichlorohydrin, the reaction was held for another 1 hour at 90° C., and then for 30 minutes at 110° C. The reactor was then cooled to 40° C. and the polyepichlorohydrin was tansferred to an autoclave for quarternization. About 361.22 grams of 45% trimethylamine aqueous solution (2.75 mole of trimethyamine) was added to polyepichlorohydrin. The blend was heated to 100° C. for 24 hours. The composition was clear without sediments. The theoretical molecular weight is about 780 g/mole and this product is named Composition A.

Example 2

Cocktails 1 and 2 as shown in Table 1 are fluids that were injected into the reservoir to enhance oil recovery. The emulsion was produced in the lab by mixing either Cocktails 1 or 2 with the oil at 90:10 or 50:50 by weight, respectively, under a high shear via the Silverson L4RT Mixer at 5,000 rpm for 2 minutes. The produced emulsion was then subjected to the described testing. Cocktails 1 and 2 contained a very low concentration of the surfactant that was used to achieve ultra low interfacial tension between the trapped oil and the injection fluid/formation water. The ultra low interfacial tension also allowed the alkali present in the injection fluid to penetrate deeply into the formation and contact the trapped oil globules. The alkali present in the fluids (e.g., $Na_2CO_3$) then reacted with the acidic components in the crude oil to form additional surfactant in-situ to continuously provide ultra low interfacial tension and free the trapped oil. In the alkaline surfactant polymer ("ASP") Process, polymer present in the injection fluid was used to increase the viscosity of the injection fluid, minimize channeling, and provide mobility control. These surfactant and polymer molecules have a tendency to adsorb at the oil droplet, thereby, stabilizing the emulsions.

The tests that produced the data in Tables 2 and 4 were conducted in graduated six ounce prescription bottles to allow for rapid water drop readings. All bottles used 100 ml of emulsion. After pouring the emulsion followed by chemical addition, the bottles were allowed to reach the desired temperature via a water bath. Upon reaching the desired temperature, the samples were shaken via a mechanical shaker and then returned to the water bath. Water drop readings were recorded in millimeters. The values were also used to gauge emulsion stability, where a faster water drop indicated lower emulsion stability. As can be seen in Table 2, the present invention is very effective at resolving the emulsion. Conventional demulsifiers such as ethoxylated propoxylated alkyl phenol-formaldehyde resins and alkylphenol polyethylene oxide were found not to be effective under the tested experimental conditions. Also, cationic surfactant such as alkyldimethylbenzyl ammonium chloride required a much higher dosage (7,000 ppm) as compared to 3,000 ppm for the tested composition of the present invention (i.e., Composition A).

TABLE 1

Water chemistry for ASP flood

| Species | Cocktail 1 | Cocktail 2 |
|---|---|---|
| NaCl (g/L) | 3.115 | 3.115 |
| $CaCl_2 \cdot 2H2O$ (g/L) | 0.096 | 0.096 |
| $MgCl_2 \cdot 6H2O$ (g/L) | 0.093 | 0.093 |
| $NaHCO_3$ (g/L) | 1.310 | 1.310 |
| KCl (g/L) | 0.054 | 0.054 |
| $Na_2SO_4$ (g/L) | 0.236 | 0.236 |
| Surfactant A, ppm | 1,500 | — |
| Surfactant B, ppm | 1,500 | — |
| Surfactant C, ppm | — | 1,500 |
| Surfactant D, ppm | — | 1,500 |
| Diethylene glycol monobutyl ether (DGBE), ppm | 10,000 | 10,000 |
| $Na_2CO_3$, ppm | 10,000 | 10,000 |
| Polyacrylamide, ppm | 1,500 | 1,500 |

The demulsification was performed at 60° C. using Composition A as described in Example 1.

TABLE 2

Bottle test results of demulsification
of an Alkaline Surfactant Polymer (ASP) process

| ASP solution | Oil Cut | Dose (ppm) | Water Drop, (ml per 100 ml emulsion) | | | | |
|---|---|---|---|---|---|---|---|
| | | | 30 min | 1 hr | 2 hrs | 4 hrs | Overnight |
| Cocktail 1 | 10% Oil Cut | 1,000 | 90 | 90 | 90 | 90 | 90 |
| | | 2,000 | 90 | 90 | 90 | 90 | 90 |
| | | 3,000 | 90 | 90 | 90 | 90 | 90 |
| | | 4,000 | 90 | 90 | 90 | 90 | 90 |
| | 50% Oil Cut | 500 | 0 | 0 | 18E* | 30E | 30E |
| | | 1,000 | 0 | 20 | 40 | 42 | 45 |
| | | 2,000 | 5 | 38 | 42 | 43 | 45 |
| | | 3,000 | 40 | 42 | 42 | 42 | 45 |
| | | 4,000 | 49 | 49 | 49 | 49 | 49 |
| Cocktail 2 | 10% Oil Cut | 500 | 92 | 90 | 90 | 90 | 90 |
| | | 1,000 | 92 | 90 | 90 | 90 | 90 |
| | | 2,000 | 91 | 90 | 90 | 90 | 90 |
| | 50% Oil Cut | 1,000 | 0 | 0 | 0 | 0 | 30E |
| | | 2,000 | 42 | 43 | 43 | 45 | 45 |
| | | 3,000 | 46 | 45 | 46 | 46 | 45 |
| | | 4,000 | 46 | 46 | 46 | 46 | 46 |
| | | 5,000 | 47 | 46 | 46 | 46 | 46 |
| Untreated | 10% Oil Cut | | 0 | 0 | 0 | 78E | — | 9 |

*Water drop number with an "E" designation indicates the water phase is oil-in-water emulsion (dirty water)

TABLE 3

Water chemistry for Surfactant Flood

| Species | Amount |
|---|---|
| NaCl (g/L) | 4.81 |
| $CaCl_2 \cdot 2H_2O$ (g/L) | 1.00 |
| $MgCl_2 \cdot 6H_2O$ (g/L) | 2.01 |
| $NaHCO_3$ (g/L) | 3.99 |
| $Na_2SO_4$ (g/L) | 0.13 |
| Petrostep S13D (anionic surfactant) (ppm) (84.32% active) | 5,000 |

Table 3 lists the injection fluid constituents for the composition used in the surfactant flood. The emulsion was produced in the lab by mixing the injection fluid with the oil at 75:25 wt/wt, respectively, by shaking the bottle containing the mixture mechanically for 10 minutes. The demulsifier was added to the above emulsion and the bottle was again shaken for 2 minutes. The demulsification was performed at 25° C. using Composition A and alkyldimethylbenzyl ammonium chloride using the testing method described previously. In the test results presented in Table 4, oil drop readings were recorded (as opposed to water drop readings above) and were converted to the percentage of oil content. As can be seen in Table 4, the present invention (e.g., Composition A) outperformed the alkyldimethylbenzyl ammonium chloride (Composition B) as indicated by a higher value for oil drop and much cleaner water and also yielded a dry oil as indicated by small values of bottom sediment or settlings (BS) and slug. The calculations and definitions of these values are discussed below.

Following the water drop readings, the resolved or partially resolved oil from each bottle was analyzed for water content. Using a syringe with a needle, a small portion of the oil (about 6 ml) was withdrawn. This aliquot of oil was added to a graduated API centrifuge tube containing an equal volume of an aromatic solvent and the contents were shaken by hand. Following centrifugation, the percent residual emulsion, typically referred to BS, was noted for each bottle. After recording BS values, alkyl sulfonate surfactant (a chemical known to resolve the remaining emulsion) was added to the centrifuge tube. Such chemicals are generally called "slugging or knockout chemicals" and are typically low molecular weight sulfonate-based materials. After slugging, the tube was again shaken and centrifuged as previously described. The BS was thus completely eliminated and only water remained in the bottom part of the tube. The slug grindout number is reported as a percentage. Smaller values of BS and slug indicate drier oil.

TABLE 4

Bottle test results of demulsification
of a surfactant flood emulsion with 25% oil cut

| Treatment | ppm | Oil drop, % | | | | | Thief Grindout | |
|---|---|---|---|---|---|---|---|---|
| | | 0.5 hr | 1 hr | 2 hr | 4 hr | 20 hr | BS | Slug |
| Untreated | 0 | 0 | 8 | 16 | 52 | 72 | 15.2 | 6.0 |
| Comp. A | 2,000 | 100* | 100 | 100 | 100 | 100 | 0.8 | 0.8 |
| Comp. B | 2,000 | 76** | 84** | 84** | 84** | 84** | 0.8 | 0.8 |

*Clean water
**Dirty water

Table 5 lists an example of the injection fluid used for surfactant-polymer flood (SP). The procedures for making the emulsion and demulsification were described previously. Petrostep is available from Stepan Company located in Northfield, Ill. and Flopaam is available from SNF Floerger located in Andrezieux, France (trademarks are property of the respective owners).

TABLE 5

Produced Brine Formulations to make
100 g Brine for Surfactant-Polymer Flood

| | brine |
|---|---|
| NaCl (grams) | 1.0 |
| $CaCl_2 \cdot 2H_2O$ (grams) | 0.1834 |
| (Ca++, ppm) | 500 |
| FLOPAAM ® 3330S (grams), 8 MM MW HPAM | 0.12 |
| PETROSTEP ® S-1 (15.86% active; grams*) | 0.9458 |
| PETROSTEP ® S-2 (22.49% active; grams*) | 0.2223 |
| Iso-butyl alcohol (R-3041; grams) | 0.4 |

*weight of surfactants as received

Table 6 shows the demulsification results conducted at 25° C. In this Table, Compositions C, D, and E have the same chemistry as Composition A (see Example 1) but different molecular weights. The theoretical molecular weights for Compositions A, C, D, and E are 780 g/mole, 2,300 g/mole, 1,500 g/mole, and 320 g/mole, respectively. Composition F is a pyridinium benzyl quat and Composition G is a high molecular weight polydiallyldimethylammonium chloride-polyacrylic acid copolymer. Compositions A, C, and D broke the emulsion quickly (15 minutes), gave clean water after the emulsion was resolved, and produced dry oil. Other compositions took longer to break the emulsion, gave dirty water or wet oil.

TABLE 6

Bottle test results of demulsification of a surfactant-polymer flood emulsion with 30% oil cut. Unless otherwise noted, the water separated from the emulsion was clear and clean

| Product | ppm Actives | Water drop (ml/100 ml emulsion) | | | | Thief Grindout | |
|---|---|---|---|---|---|---|---|
| | | 15 min | 1 hr | 2 hr | 3 hr | B.S | Slug |
| Untreated | 0 | 20* | 50* | 60* | 60* | 28 | 34 |
| Comp. A | 200 | 65 | 69 | 69 | 70 | 0.6 | 0.6 |
| Comp. B | 210 | 68** | 68** | 70** | 70** | 0.4 | 0.4 |
| Comp. C | 200 | 65** | 69 | 69 | 69 | 0.8 | 0.8 |
| Comp. D | 200 | 66** | 69 | 69 | 70 | 0.8 | 0.8 |
| Comp. E | 200 | 20* | 40* | 60* | 60** | 13 | 24 |
| Comp. F | 200 | 65** | 65** | 68* | 65* | 0.6 | 0.2 |
| Comp. G | 210 | 10* | 39* | 60* | 62** | 11 | 25 |

*the water is dirty and rag layer (emulsion at the oil/water interface) is present
**the water is dirty but no rag layer is formed All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated.

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combination of some or all of the various embodiments described herein. Any and all patents, patent applications, scientific papers, and other references cited in this application, as well as any references cited therein, are hereby incorporated by reference in their entirety. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

The claimed invention is:

1. A method of demulsifying a produced emulsion from an enhanced oil recovery flood to give clean water with less than about 300 ppm residual oil and dry oil with less than about 1% total sediment, the method comprising:
adding an effective amount of a composition to the produced emulsion, the composition comprising at least one water soluble quaternary adduct of a tertiary amine and a polyepihalohydrin, said adduct being greater than 99% quaternized and having a weight average molecular weight of from about 500 to about 2,500 Daltons; a solvent comprising an organic solvent, water, or a combination thereof, wherein the produced emulsion comprises water and oil, and the quaternary adduct has the general formula:

$$H + \left[ O - CH_2 - CH - \right]_z OH$$
$$\underset{R}{\overset{CH_2}{|}} \underset{R}{\overset{N^+}{|}} X^-$$

wherein each R is independently methyl or ethyl, $X^-$ is a halide selected from the group consisting of fluoride, chloride, bromide, iodide, astadide, or a combination thereof, and z ranges from about 4 to about 22.

2. The method of claim 1, wherein the composition is free of zinc chloride.

3. The method of claim 1, wherein X is chloride.

4. The method of claim 1, wherein z is 6.

5. The method of claim 1, wherein at least one R is methyl.

6. The method of claim 1, wherein each R is methyl.

7. The method of claim 1, wherein the composition comprises from about 30 to about 90 wt % active material.

8. The method of claim 1, wherein the organic solvent comprises an alcohol, an ether, an aromatic compound, or a combination thereof.

9. The method of claim 1, wherein the effective amount of the quaternary adduct comprises from about 50 ppm to about 20,000 ppm of the quaternary adduct, based on actives and total emulsion volume.

10. The method of claim 9, wherein the composition comprises from about 200 ppm to about 10,000 ppm of the quaternary adduct, based on actives and total emulsion volume.

11. The method of claim 1, wherein the produced emulsion further comprises an anionic surfactant.

12. The method of claim 1, wherein the produced emulsion further comprises a cationic surfactant, a nonionic surfactant, an amphoteric surfactant, or a combination thereof.

13. The method of claim 1, wherein the enhanced oil recovery flood is an alkaline surfactant-polymer (ASP) flood.

14. The method of claim 3, wherein z is 6.

15. The method of claim 14, wherein at least one R is methyl.

16. The method of claim 15, wherein each R is methyl.

17. The method of claim 16, wherein the organic solvent comprises an alcohol, an ether, an aromatic compound, or a combination thereof.

18. The method of claim 17, wherein the effective amount of the quaternary adduct comprises from about 50 ppm to about 20,000 ppm of the quaternary adduct, based on actives and total emulsion volume.

19. The method of claim 18, wherein the produced emulsion further comprises an anionic surfactant.

20. The method of claim 19, wherein the enhanced oil recovery flood is an alkaline surfactant-polymer (ASP) flood.

\* \* \* \* \*